(12) United States Patent
Melford

(10) Patent No.: US 6,515,810 B1
(45) Date of Patent: Feb. 4, 2003

(54) MOUNTING MODULE FOR AN OPTICAL ELEMENT

(75) Inventor: Terence N Melford, Bristol (GB)

(73) Assignee: Reinshaw PLC (GB)

( * ) Notice: Subject to any disclaimer, the term of this patent is extended or adjusted under 35 U.S.C. 154(b) by 66 days.

(21) Appl. No.: 09/714,481

(22) Filed: Nov. 17, 2000

(30) Foreign Application Priority Data

Oct. 28, 2000 (GB) .............................................. 0026407

(51) Int. Cl.[7] .................................................. G02B 7/02
(52) U.S. Cl. ........................ 359/813; 359/818; 359/819; 359/827
(58) Field of Search ................................ 359/813, 818, 359/819, 821, 822, 823, 827, 896

(56) References Cited

U.S. PATENT DOCUMENTS

| | | | | |
|---|---|---|---|---|
| 4,863,243 A | * | 9/1989 | Wakefield | 359/896 |
| 5,194,993 A | * | 3/1993 | Bedzyk | 359/813 |
| 5,446,970 A | | 9/1995 | McMurtry et al. | |
| 5,936,785 A | * | 8/1999 | Do et al. | 359/822 |
| 6,266,196 B1 | * | 7/2001 | Do et al. | 359/819 |

FOREIGN PATENT DOCUMENTS

EP 0 748 669 A1 12/1996

OTHER PUBLICATIONS

"Optics Guide 5", Melles Griot, (1990) front cover, inside cover, pp. 23–32, 23–33, 23–34 and 23–35.

* cited by examiner

Primary Examiner—Georgia Epps
Assistant Examiner—Gary O'Neill
(74) Attorney, Agent, or Firm—Oliff & Berridge, PLC

(57) ABSTRACT

A module for mounting an optical element (e.g. a lens) in a predetermined position in an optical apparatus comprises a carrying member which holds the optical element and a receiving member, for attachment to the optical apparatus, for receiving the carrying member. The carrying member is guided into the receiving member transverse to the optical axis of the optical element by a combination of pins on the carrying member engaging with grooves in the receiving member and pins on the receiving member engaging with recessed ledges on the carrying member. Locating elements on the carrying member engage with locating elements on the receiving member to constrain the degrees of freedom of the carrying member kinematically. Magnets hold the carrying member and receiving member together.

10 Claims, 1 Drawing Sheet

MOUNTING MODULE FOR AN OPTICAL ELEMENT

BACKGROUND OF THE INVENTION

1. Field of the Invention

This invention relates to a kinematic mounting module for an optical element such as a lens, which allows the optical element to be moved from and replaced into a precisely defined position.

2. Description of Prior Art

In an optical system, such as spectroscopic apparatus, it is often required to remove a lens from the system and replace it with another lens in exactly the same position. The lens must be realigned each time and often the lens is in an awkward position which makes exchanging lenses difficult and time consuming. In addition, there is the danger of crashing into and damaging adjacent objects when replacing the lens in such a confined space. The same problem exists with other optical elements, such as mirrors and filters.

It is known to use a kinematic support arrangement to enable an object to be repeatably moved into and held in a precisely defined location. Such an arrangement is disclosed (though not in the field of mounting an optical element) in EP 0748669, in which a probe arm in a machine tool is movable in and out of a housing. Kinematic elements on a collar of the probe arm engage with further kinematic elements on an end plate of the housing to precisely define the operative position of the probe arm. Guide means guide the probe arm into its operative position, causing the collar to move towards the end plate along an axis orthogonal to their respective mating surfaces.

However this arrangement would sometimes not be suitable for repeatably positioning a lens in a precisely defined location in an optical system. The action of guiding the lens along the optical axis of the lens would have two main disadvantages. Firstly this arrangement would require a lot of space within the optical system and secondly, it would be difficult not to obstruct the optical path with the apparatus needed for this construction.

SUMMARY OF THE INVENTION

According to the present invention, an optical module which allows an optical element to be removed from and replaced into a predetermined position comprises:

a carrying member for carrying the optical element;

a receiving member for attachment to the optical system for receiving the carrying member;

mutually engageable locating elements on the carrying member and on the receiving member respectively, said elements co-operating with each other when engaged to constrain the degrees of freedom of the carrying member kinematically, thereby precisely defining the predetermined position; and guide means for guiding the carrying member into a position in the receiving member in which the locating elements are engaged with each other.

Preferably the optical element has an optical axis, and the guide means guides the carrying member into its position in the receiving member in a direction transverse to the optical axis.

The optical element may be a lens.

Reference should be made to U.S. Pat. No. 5,446,970 for a discussion of one meaning of the terms "kinematic", "kinematically" and like terms, as used in this specification. These terms encompass not only kinematic supports in which point contacts are provided between the respective pairs of elements on the carrying and receiving members, but also semi- or quasi-kinematic supports, in which there are small areas or lines of contact between the respective elements.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
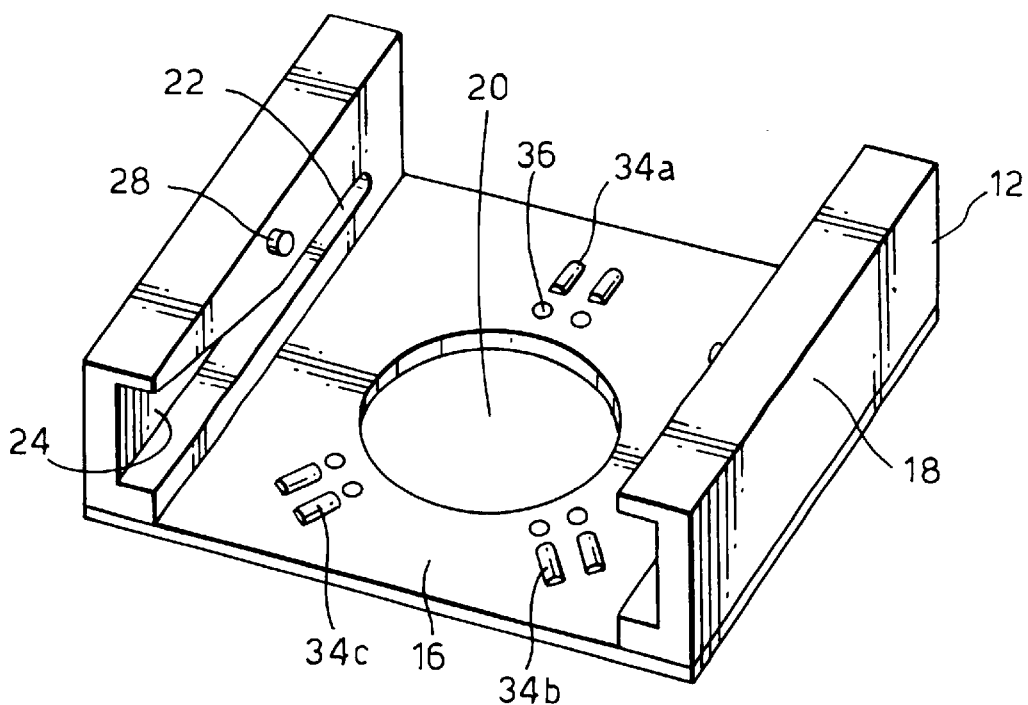
FIG. 1 is an isometric view of a lens mount of the lens positioning system.
Figure 2:
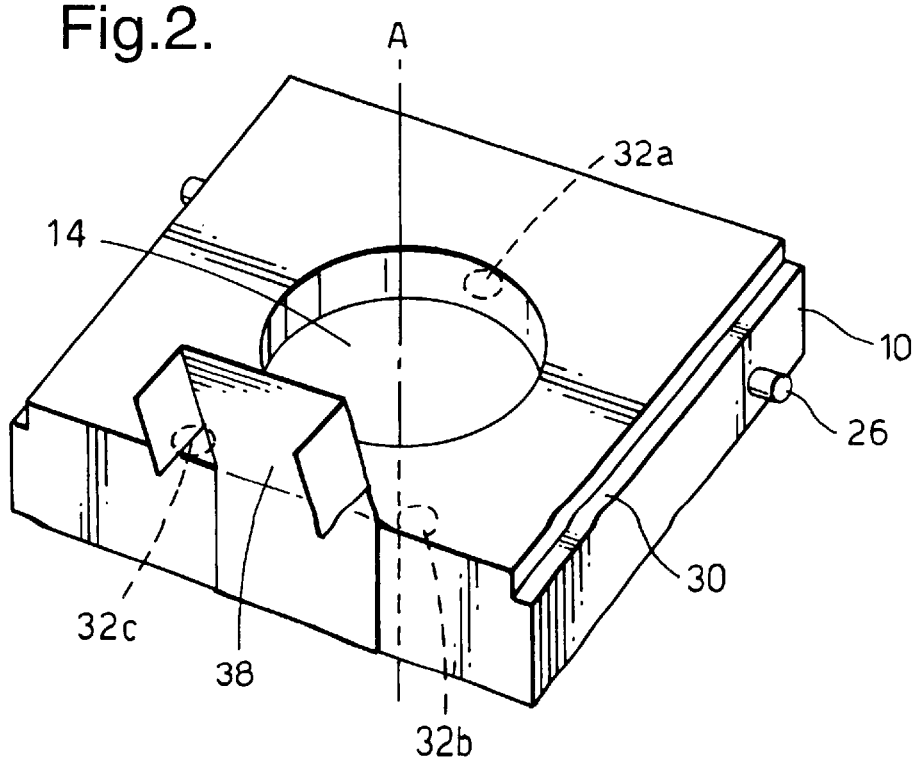
FIG. 2 is an isometric view of a lens holder of the lens positioning system.

The lens positioning system shown in FIGS. 1 and 2 comprises two main components, a lens holder 10 and a lens mount 12. The lens mount 12 is fixed in position at the desired location of the lens within the spectroscopic or other optical apparatus and receives the lens holder 10. The lens holder has a handle 38 and a central aperture 14 into which a lens is fitted.

The lens mount 12 consists of a plate 16 with two raised side portions 18 and a central aperture 20. The central aperture 20 is in alignment with the lens when the lens holder 10 is inserted into the lens mount 12. The side portions 18 extend from opposite sides of the plate 16 and each has a groove 22 parallel to the plate on its inner surface which extends from a position close to one end of the plate to the other end where the groove increases in width at 24. A pair of pins 26 on opposite sides of the lens holder 10 engage with the grooves 22 and guide the lens holder into the lens mount. In addition the lens holder 10 has two recessed ledges 30 extending along two opposite sides which interact with pins 28 positioned above the grooves 22 in the lens mount 12 to assist in guiding the lens holder into position in the lens mount. The combination of the groove and pins arrangement and the pins and ledge arrangement enable the lens holder to slide transversely into the lens mount in a direction parallel to their respective lower and upper surfaces (i.e. transverse to the optical axis A of the lens, shown in FIG. 2).

The lens holder is held in a precise position by a kinematic support. This kinematic support is provided by three balls located on the bottom surface of the lens holder spaced at 120° from each other around the axis of the central aperture 14. These interact with three similarly spaced pairs of cylindrical elements 34 on the top surface of the plate 16 of the lens mount 12. The balls are guided into engagement with the cylindrical elements by the action of the grooves 22 and pins 28 on the lens mount interacting with corresponding pins 26 and ledges 30 in the lens holder.

The balls 32 are positioned around the central aperture such that the ball 32a towards the end of the lens holder which is first inserted into the lens mount is located midway between opposite sides so that it may easily slide into position between the corresponding pair of cylindrical elements 34b which are aligned with their longitudinal axis in the direction of travel of the lens holder. Balls 32b, 32c may not so easily slide into engagement with the cylindrical elements 34b, 34c as the cylindrical elements 34b, 34c are at an angle to the direction of travel. However the wider portions at the front end of the grooves 24 enable the balls 32*b*, 32*c* to slide over the cylindrical elements 34*b, c* and into position. Once in position, magnets 36 on either the lens holder or the lens mount hold the lens holder and lens mount together. This engagement constrains the degrees of freedom of the lens holder kinematically to precisely define its position. The pins 26, 28, grooves 22 and ledges 30 are dimensioned such that they are not quite in contact when the balls 32 and cylindrical elements 34 are engaged. This ensures that they do not interfere with the kinematic location.

Any other arrangement of elements co-operating to produce a kinematic support may be used. For example three pairs of balls may co-operate with three cylindrical elements. Alternatively, three balls may co-operate with three v-grooves. In any of these examples, it is not important which set of elements are on the lens holder and which corresponding set is on the lens mount.

This lens positioning system allows an operator to remove a lens and replace it with an alternative one quickly whilst ensuring the lens is replaced in the correct position. As the lens holder is inserted into the lens mount in a direction parallel to the plane of the plate of the lens mount, this system takes up no additional space within the optical apparatus and the optical path will not be obstructed.

This invention is not restricted to the positioning of lens but is suitable for other optical elements within an optical system.

What is claimed is:

1. An optical module which allows an optical element to be removed from and replaced into a predetermined position comprising:

a carrying member for carrying the optical element;

a receiving member for attachment to the optical system for receiving the carrying member;

mutually engageable locating elements on the carrying member and on the receiving member respectively, said elements co-operating with each other when engaged to constrain the degrees of freedom of the carrying member kinematically, thereby precisely defining the predetermined position; and guide means for guiding the carrying member into a position in the receiving member in which the locating elements are engaged with each other.

2. An optical module according to claim 1, wherein the guide means guides the carrying member in a direction transverse to the optical axis of the optical element.

3. An optical module according to claim 1 wherein the guide means comprise at least one pin on one of the carrying member and the receiving member, engageable with at least one groove on the other of the carrying member and the receiving member.

4. An optical module according to claim 1, wherein the guide means comprise at least one pin on one of the carrying member and the receiving member, engageable with at least one recessed ledge on the other of the carrying member and the receiving member.

5. An optical module according to claim 1, wherein a biasing device is provided to urge the carrying member and the receiving member together.

6. An optical module according to claim 5, wherein the biasing device is a magnet on one of the carrying member or the receiving member.

7. An optical module according to claim 1, wherein the carrying member has a central aperture for carrying the optical element which is aligned with a central aperture of the receiving member when the carrying member is located within the receiving member.

8. An optical module according to claim 1, wherein the mutually engageable locating elements on the carrying member and receiving member respectively are in three sets spaced 120° apart around the optical axis of the optical element.

9. An optical module according to claim 1, wherein at least one locating element on the carrying member is arranged such that it may slide into engagement with at least one locating element on the receiving member.

10. An optical module according to claim 1 wherein the optical element is a lens.

* * * * *